2,926,428

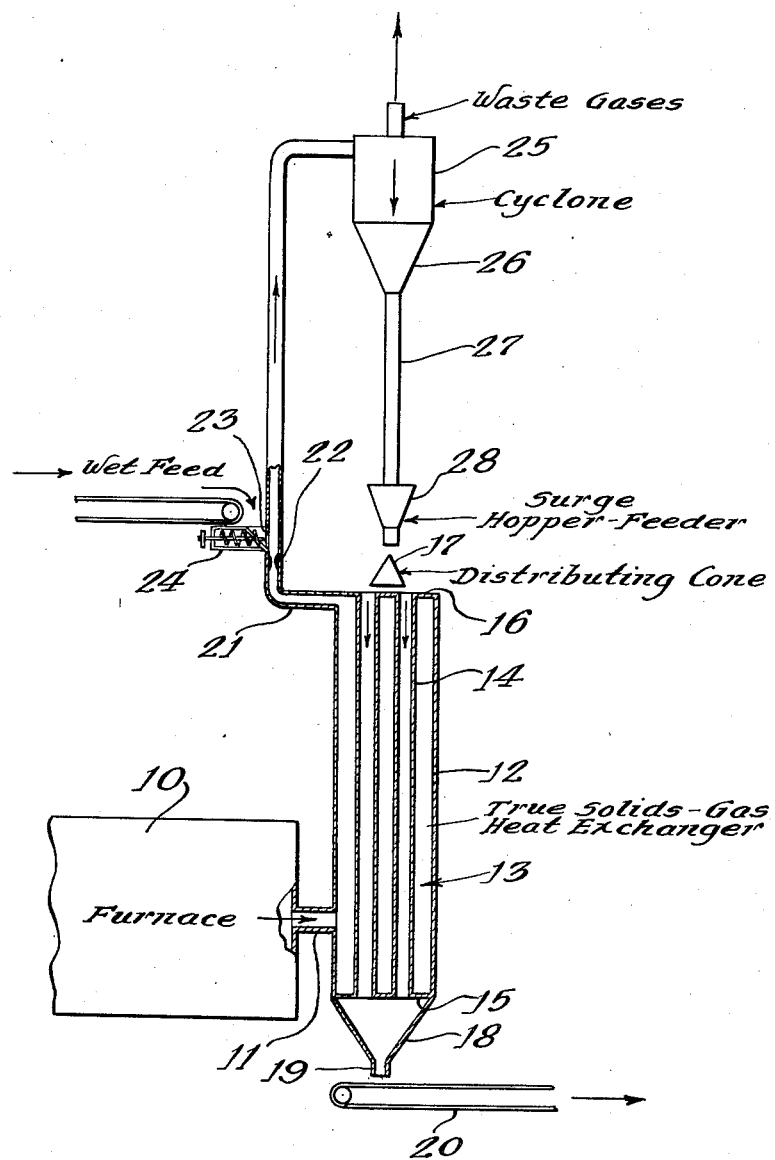

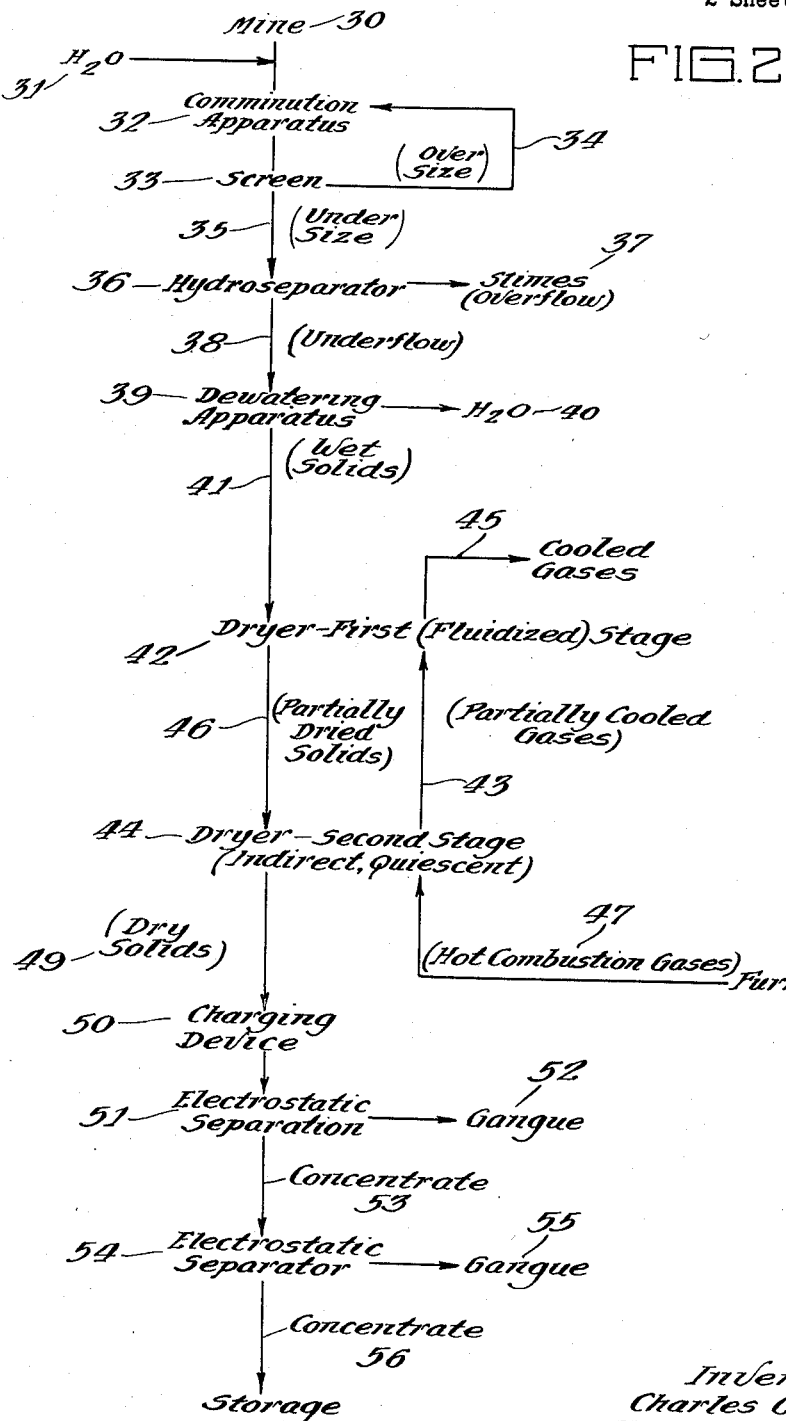

DRYING METHOD AND APPARATUS

Howard W. Adam, Gouverneur, N.Y., and Charles C. Cook, Carlsbad, N. Mex., assignors to International Minerals & Chemical Corporation, a corporation of New York Application July 5, 1956, Serial No. 596,104

6 Claims. (Cl. 34—17)

This invention relates to the field of beneficiation of comminuted solid materials. More particularly it relates to a high capacity continuous drying method giving close control over the final moisture content of the solids. Still more particularly it relates to a method of drying of high throughput and high efficiency without rendering the drying solids non-responsive to the forces of an electrostatic field.

Electrostatic separations require a feed material made up of dry particles whose surfaces are cleansed of foreign matter to an extent permitting the particles to exhibit a definite electrical charge. Surface contamination which interferes with charging may be either fine particle size foreign matter or combustion products deposited upon dry solids. The prior known drying methods have all shown one or more deficiencies which render them unacceptable for commercial application.

Rigby, 1,219,155, shows a two-step drying method in which the solids are first suspended in combustion gases and conveyed to a cyclone separator and the drying of the solids is completed in a steam heated rotary kiln. Agitation of the type obtained in a rotary kiln or when fluidizing, particularly when the solids are being reduced to final dryness, renders the particles non-susceptible to definite charging and to electrostatic beneficiation.

Andersen, 1,913,470, shows a method which dries solids in two stages, each stage being a heat exchanger. This method prevents contamination of the dry solids with combustion products, but is of low capacity because of the limitations imposed by heat transfer through pipe walls.

It is a primary object of this invention to overcome the shortcomings and disadvantages of methods and apparatus heretofore in use.

It is another object of this invention to provide a drying method giving a large volume of dry solids feed for electrostatic separation apparatus.

It is still another object of this invention to provide a method of drying granular solids which provides higher heat utilizing efficiency than has been obtained heretofore.

It is still another object of this invention to provide apparatus for drying which combines high capacity with agitation characteristics giving dry products which may be electrostatically separated.

These and other objects of the invention will be apparent to those skilled in the art from a reading of the following description.

Briefly, the invention comprises apparatus and a method wherein the drying operation is carried out in two stages. In the second stage, continuously moving granular solids are reduced to final dryness by indirect heat exchange with combustion gases coming directly from a furnace. Combustion gases issuing from the heat exchanger pass directly to a wet feed drier, where the moisture content of the solids is reduced to a point approaching about 0.5% by weight as a minimum, while the granular solids are conveyed thereby to a gas-solids separator. The partially dried solids recovered in the separator are fed directly, while hot, to the second stage heat exchanger. Hot granular solids issuing from the heat exchanger are conveyed to the electrostatic separator during a time interval permitting the solids to cool to the desired separation temperature before delivery to the separation unit.

The apparatus of the instant invention comprises, in combination, a vertical tube gas-solids heat exchanger adapted to have the solids contained or confined within the tube, an elongated conduit of substantially uniform cross-section serving as an outlet from the heat exchanger shell for combustion gases, feed means for delivery of wet granular solids into said conduit-outlet for gas, means for separating solids and combustion gases at the end of said conduit, feeder mechanism for delivery of partially dried solids from the separator means to the top of the tubes of the heat exchanger, and means adjacent the bottom of said tubes of the heat exchanger for the continuous removal of said solids and delivery thereof to the electrostatic separator.

The heat exchanger comprises a shell with inlet for combustion gases adjacent the bottom thereof, and an outlet for gases adjacent the top thereof. Such an arrangement is simple, since this brings the hottest gases directly from the furnace into heat exchange relationship with the driest solids. However, other arrangements are possible if sufficient gas moving capacity is installed at the furnace or after the gas-solids separator in the combustion gas line. Inside the shell are one or more substantially vertical tubes 6 to 10 feet long and of 3 to 10 inches in diameter. The number of tubes and the diameter thereof are determined primarily by the quantity of material to be handled and the difficulty of removal of the final quantities of moisture from the granular solids.

When processing materials which are difficult to dry, generally a large number of longer and smaller diameter tubes are used. Tubes in this heat exchanger are usually stainless steel units capable of standing temperatures of the order of 1600° F. to about 2200° F., and have a tube wall of about 1/8 to 1/4 inch thickness. Solids are removed from the bottom of the heat exchanger by suitable means, such as a belt unloader working adjacent a restricted throat opening of a cone collector for material which has passed through the tubes, or the tubes may be unloaded individually and incrementally by an unloading table having a knife to shunt material from the table to a conveyor belt which delivers solids to a feeder or metering device for controlling the flow of solids to the electrostatic separation unit.

The gas outlet from the heat exchanger shell is a pipe of substantially uniform cross-section and of about 18 foot length and preferably about 24 foot length which delivers the conveyed solids into, for example, a cyclone separator. Diameter of this pipe must be such that a gas velocity through the pipe is maintained high enough to convey all solids. For a feed of −1 millimeter size, gas rates of the order of 1200 feet to about 2400 cubic feet per minute (measured at 60° F.) give safe, trouble-free operation. For drying granular phosphate material, a 10 inch diameter pipe will handle the above quantity of gas and dry 12 to 15 tons per hour of solids. To dry about 100 tons per hour of solids under substantially the same conditions, a pipe of 30 inch diameter is required. The cyclone separator and the conveying pipe delivering solids may be of any standard design capable of handling the quantity of granular solids and of withstanding the gas temperature. Gravity, or other suitable feeding device such as a worm conveyor, is used to convey partially dry solids from the cyclone separator to the heat exchanger. Solids in final dry condition are removed from the heat exchanger, accumulated in a hopper, and delivered from this surge unit to an agitating unit, which may be a vibrating material trough or spinning cup or equivalent apparatus to charge the solids by contact potential methods.

Material discharged, for example, from a vibrating trough falls as freely falling bodies between spaced stationary electrodes of plate or other suitable design, maintained at different polarities and usually having a D.C. potential impressed thereon sufficient to produce a relatively high field gradient. Adjacent the bottom of these electrodes are collection hoppers for accumulation of products.

The method of completing the drying comprises indirect heat exchange between a falling or settling, loosely packed mass of granular solids and combustion gases direct from a furnace having a temperature generally in the range between about 1800° F. and about 3000° F., preferably 2000° F. to about 2400° F., although lower temperatures can be used if the solids are of a nature which readily release the final moisture. Gases leave the exchanger at temperatures generally in the range between about 1400° F. and about 1700° F. Solids enter the heat exchanger tubes at a temperature generally in the range of between about 175° F. and about 220° F., and have a moisture content between about 0.5% and about 3% by weight, preferably 0.75% to about 1.5%. When tubes are filled with granular, loosely packed solids, the solids slowly settle through, for example, an 8 inch diameter, 10 foot long tube at a rate of about 0.8 ton to about 1.2 tons per hour. Material isuing from the heat exchanger will vary in temperature depending upon the temperature of the furnace gases. Utilizing combustion gases in the above-mentioned range, solids leaving the exchanger have a temperature in the range between about 290° F. and about 380° F. These hot granular solids leave the exchanger with a moisture content of less than about 0.2% and preferably less than about 0.1% by weight.

Outlet gases from the heat exchanger pass through a pipe of substantially uniform cross-sectional configuration, except for a slight constriction below the point of introduction of wet feed. This constriction creates a slight Venturi effect, reducing pressure at the wet feed inlet so that there is substantially no tendency for combustion gases to blow out the solids inlet.

Wet granular feed delivered to the conveying pipe will generally have a moisture content varying from about 5% to about 9% if stock-piled. If the granular feed is of a type which requires repeated washing to remove slime, such as phosphate washer debris, the feed, unless subjected to stock-piling in a drying atmosphere, will then range from about 12% to about 20% by weight. Control of the final moisture conent of the product in the preliminary drying stage is obtained by control of the inlet gas temperature. By inter-control of mass velocities and inlet gas temperature, a constant outlet gas temperature may be maintained. Gas entering the conveying pipe generally will have a temperature in the range between about 1400° F. and about 1700° F., although this temperature may vary considerably depending upon inlet gas temperatures and radiation losses from the heat exchanger.

Outlet gas temperatures for the suspended solids drier, i.e., gas vented from the cyclone separator, generally are maintained in the range between about 180° F. and about 235° F., and preferably in the range between about 190° F. and about 215° F. When utilizing outlet temperatures in the general range above, material having a moisture content between about 1.5% and about 0.5% by weight can be secured from partially dry phosphate rock, and most granular materials will give a corresponding result.

While ore which has been dried to a moisture content between about 0.2% and about 0.5% under the conditions of vigorous agitation existing in the conveying drier (the first drying stage of the present invention) can be separated by electrostatic means, the degree of beneficia-tion which can be accomplished is considerably below optimum, and falls rapidly lower as the degree of drying approaches the 0.2% moisture level. Moisture content in excess of 0.5% adversely effects beneficiation and rapidly reduces the beneficiation to uneconomical proportions. First stage conveying drying is limited, therefore, to reducing the moisture content to a point approaching 0.5% by weight.

After the comminuted material is reduced to the desired low moisture content in the second stage, drying control must be exercised during transfer of solids in ambient air to insure that the solids temperature does not fall below the effective range for charging separation. As distinguished from the other methods in common use where, for example, material is not merely polarized as in the case of pyroelectric crystals, the charging of the particles may be and preferably is carried out in the absence of an electrical field. In the performance of this step, the particles are differentially electrified so that one component of the ore carries an elecrtical charge of different character or of different magnitude from the other components of the comminuted mixture. Differential electrification may be created by utilizing the contact potential phenomenon such as by frictional or rubbing contact between particles either in contact with a donor plate or not. When the quantities of different ore components of a substantially uniform particle size are not widely disproportionate, contact potential charging may be effectively carried out by agitation or movement of the mixture. Under such conditions, a donor plate is not critical to the operation. When charging concentrates, particularly of relatively high purity, contact potential may give only weak charging of one component of the mixture and at this stage, use of a donor element is generally advantageous. By "grounded donor plate" is meant an element of low work function which readily exchanges electrons with the ore particles when the plate is grounded to the earth, and for optimum charging would have a work function betwen the two components which it is desired to separate. One method of accomplishing this result is to convey ore particles such as phospate ore having a temperature in the range of approximately 160° F. to approximately 360° F. to a feeder of lead, zinc, aluminum, copper, tin, iron, or the like, grounded to the earth by an electrical conductor. The ore particles are caused to flow over the chute surface in agitated action such as is caused by a vibrator.

Dielectric or nonconducting materials vary in their acceptance of an electrical charge. In general it may be stated that electrons flow from the material of lower work function to the material of higher work function, with the result that, for example, silica particles become negatively charged. The charge on the silica particles is at least definitely more negative than the charge on most of the remainder of the or particles, the majority of the latter exhibiting a positive charge.

Particles which have acquired a charge may then be separated as, for example, by being fed as freely-falling bodies between the electrodes of one or more electrostatic separating units; i.e., in a path normally not in contact with said electrodes.

The strength of the electrostatic field maintained between electrodes which will effectively alter the path of falling particles varies with the particle size of the ore fed to the separator. The voltage may vary from 5,000 volts per inch of distance between electrodes in separating material of relatively fine particle size in the range of approximately 125 mesh to approximately 200 mesh, to 15,000 volts per inch of distance separating electrodes handling coarse particles. In all such discussions of field strength, it must be borne in mind that corona discharges which ionize air are to be avoided. In general, it is preferred to operate with a total impressed difference in potential of about 70,000 to about 90,000 volts, although voltages as low as about 20,000 and as high as 200,000 are utilized on occasion. This voltage should be maintained at a high direct voltage potential substantially free of alternating current components; i.e., filtered D.C. current should be low in the so-called A.C. ripple. A standard supply of D.C. voltage may also be obtained without expensive filtering apparatus by the use of such equipment as radio frequency power supply.

The invention will be more fully understood from the following description in conjunction with Figures 1 and 2, which are attached. Figure 1 is a schematic representation of our two stage dryer, and Figure 2 is a schematic flow sheet of an electrostatic separation process employing our two stage dryer.

With reference to Figure 1, the numeral 10 indicates a furnace for combustion of fuels such as gas or fuel oil. Furnace 10 is provided with a gas outlet connection 11 for delivery of hot combustion products to the shell 12 of a heat exchanger 13. Within shell 12 are spaced tubular members 14 generally of cylindrical shape. Tubular members 14 are secured at the top and bottom into headers 16 and 15 which close the top and bottom of shell 12. Header 16 is provided with a cone member 17 positioned with its vertical axis in alignment with the longitudinal axis of the shell 12. At the bottom shell 12 is provided with a conical receiving hopper 18 in communication with the interior of tubes 14. Hopper 18 is adapted with an axial outlet 19 adapted to deliver solids onto a conveying belt 20.

Shell 12 is provided adjacent header 16 with a conduit member 21 which is an outlet for heating gases passing through the jacket formed about tubes 14 by shell 12.

Conduit 21 is provided with a constriction 22. Above this constriction 22 is an inlet port 23 for admission of solids and in conjunction therewith suitable injection means 24 such as a continuous screw feeder. Conduit 21 delivers gas-solids suspension to a cyclone separator 25. Cyclone separator 25 is provided with a conical transition piece 26 which connects the separator with conduit 27, which delivers the solids to a surge hopper 28 positioned to cooperate with distributing cone 17 for delivery of solids to tubes 14.

With reference to Figure 2, ore from the mine 30 is slurried with water 31 and comminuted in a suitable apparatus 32 to liberate the desired values in the ore. The aqueous slurry of comminuted ore is passed through a screen 33 and oversize solids 34 retained by the screen 33 are recycled to the comminution step 32. Undersize solids 35 passing through the screen 33 are deslimed in a hydroseparator 36, the slimes 37 being discharged in the overflow.

Solids discharged in the underflow 38 of the hydroseparator 36 are subjected to dewatering in a suitable apparatus 39 such as a screw classifier. The wet solids 41 from the dewatering apparatus 39 are fed to the first stage of the dryer 42, where they are fluidized with partially cooled combustion gases 43 from the second stage of the dryer 44. The fluidized solids are conveyed to a cyclone separator (not shown) where cooled combustion gases 45 are separated from the partially dried solids 46. The partially dried solids 46 are conveyed to the second stage of the dryer 44 where they are subjected to final drying in a quiescent zone by indirect heat exchange with hot combustion gases 47 produced in furnace 48. Dry solids 49 from the second drying stage 44 are subjected to charging 50 in a suitable apparatus such as a vibrating feeder, and then subjected to free-fall electrostatic separation 51. Gangue 52, separated in the electrostatic separation 51, may be discarded or subjected to additional beneficiation steps. Concentrate 53 recovered from the electrostatic separation 51 may be stored for use or subjected to an additional electrostatic separation 54. Gangue 55 produced in electrostatic beneficiation 54 is recycled or discarded, and the concentrate 56 is recovered.

The invention will be further illustrated by the following example, given by way of illustration without any intention to limit the invention thereto.

Example

Florida phosphate pebble obtained as washer debris having by screen analysis particles in the size range of $-14$ to $+100$ mesh was subjected to scrubbing with water in order to complete the desliming operation. The scrubbing was performed in an agitating unit at 70% solids and de-watered in a Hardinge drag classifier.

The solids are comminuted ore from the classifier with a water content of about 20%. This wet ore was stored in a pile until the ore had drained to a moisture content of about 6%. The drained solids were fed to the conveying drier of the present invention by a pressure control screw feeder. The conveying pipe was 14″ in diameter and gas passed through the pipe at a velocity of approximately 2,500 cubic feet per minute measured at about 60° F. The combustion gas products discharged from the heat exchanger were at a temperature of approximately 1500° F.

The solids were conveyed to a cyclone separator. These solids were at a temperature of approximately 195° F., and had a moisture content of approximately 1.3%. The 1.3% moisture content material was dropped by gravity into a heat exchanger where the material passed as 12 columns of loosely packed granular material countercurrent to the furnace gases. The solids gradually sifted down through the 10 foot long, 8 inch diameter tubes, and was accumulated in a cone hopper at a temperature of approximately 380° F., where it was found to have a moisture content of approximately 0.1%.

Combustion gases entering the heat exchanger from the furnace had a temperature of approximately 2050° F. This product was removed from the heat exchanger at a rate of approximately 12 tons per hour.

The dry product from the heat exchanger was conveyed to a hopper in the electrostatic separation unit and was controlled to have a temperature of approximately 325° F. when delivered to a Syntron vibrating trough which had the metal trough thereof grounded to the earth by an electrical conductor. The Syntron vibrating trough discharged the particles as freely-falling bodies between electrodes spaced approximately 10 inches apart and having a length of approximately 7 feet. These electrodes were maintained at a potential gradient of approximately 8,000 volts per inch. The rate of feed of the dry comminuted material was approximately one ton per hour per linear foot of electrode. Results of the rougher separation were as follows, where "BPL" refers to "bone phosphate of lime," the term conventionally employed in the phosphate industry to designate tricalcium phosphate (Shreve, Selected Process Industries, New York. McGraw-Hill, 1950, page 313):

| Material | Percent BPL | Percent weight |
|---|---|---|
| Feed | 30.0 | 100 |
| Concentrate | 70 | 39.4 |
| Tails | 4.1 | 60.6 |
| Middling | None | |

Concentrate from the rougher, having a temperature of approximately 200° F., was fed to a second separation unit similar to that used for the rougher separation. The voltage gradient also was maintained the same. The products of the second separation were as follows:

| Material | Percent BPL | Percent weight |
|---|---|---|
| Feed | 70 | 100 |
| Concentrate | 75 | 84.0 |
| Tails | 44 | 16.0 |

Having thus fully described and illustrated the character of the invention, what is desired to be secured by Letters Patent is as follows:

1. The method which comprises preparing an ore for electrostatic separation by heating a wet, deslimed, comminuted ore in two stages, said ore being partially dried in the first stage while being conveyed in combustion gases previously partially cooled by heat exchange in the second stage, during which conveying the moisture content is reduced to between about 0.5% and about 3% by weight, and further drying said ore in the second stage by indirect heat exchange relationship between said ore in the form of a moving bed of comminuted solids and combustion gases direct from the combustion zone to reduce the moisture content of the solids to less than about 0.2% by weight, whereby the solids comprising the dried ore are maintained relatively free from surface contamination.

2. The method which comprises preparing an ore for electrostatic separation by heating a wet, deslimed, comminuted ore in two stages, said ore being partially dried in the first stage while being conveyed in combustion gases previously partially cooled by heat exchange in the second stage, during which conveying the moisture content is reduced to between about 0.75% and about 1.5% by weight, and further drying said ore in the second stage by indirect heat exchange relationship between said ore in the form of a confined, slowly moving mass of partially dry solids and combustion gases direct from the combustion zone to reduce the moisture content of the solids to less than about 0.2% by weight, whereby the solids comprising the dried ore are maintained relatively free from surface contamination.

3. The method of beneficiating a wet, comminuted ore which comprises drying said ore in two stages, said ore being partially dried in the first stage to a moisture content of between about 0.5% and about 3% by weight while being conveyed in combustion gases previously partially cooled by heat exchange in the second stage to a temperature in the range between about 1400° F. and about 1700° F., and further heating indirectly in the second stage the partially dry solids by heat exchange relationship between a confined, slowly moving mass of said partially dry solids and combustion gases direct from the combustion zone, whereby the moisture content of the solids is reduced to less than about 0.2% by weight, subjecting the dried ore as freely falling bodies to the attracting and repulsing forces of a high potential electrostatic field, and recovering a product rich in the desired ore component.

4. The method of beneficiating phosphate pebble ore comprising washing the comminuted ore free of slimes, heating the washed ore in two stages, wet solids being dried in the first stage while being conveyed in combustion gases previously partially cooled by heat exchange in the second stage, during which conveying the moisture content is reduced to between about 0.5% and about 3% by weight and the temperature of the conveying gas is reduced from about 1500° F. to about 200° F., further heating indirectly in the second stage the partially dry solids by heat exchange relationship between a confined, slowly moving mass of said partially dry solids and combustion gases having a temperature of about 2050° F. to reduce the moisture content of the dry solids to less than about 0.1% and to raise the temperature of the dry solids to about 375° F., subjecting the dry particles as freely falling bodies to the attracting and repulsing forces of an electrostatic field, and recovering a phosphate-rich product.

5. A heating unit for drying granular solids which comprises a shell, tubular members positioned within said shell, headers closing the ends of said shell having spaced apertures therein of approximately the same cross-sectional configuration as said tubular members, said tubular members being secured to said headers so that the longitudinal axes of said tubular members are in alignment with the central axes of the respective apertures in said top and bottom headers, inlet gas conduit means adjacent the bottom of said shell and in communication with the interior of said shell, means for heating said inlet gas, outlet gas conduit means adjacent the top of said shell rising to a higher elevation than the top of said shell, solids feed inlet means in said outlet conduit means, gas-solids separation means at the end of said outelt gas conduit, solids conveying means for transfer of solids from the gas-solids separation means to said tubular members within said shell, and solids removal means positioned beneath the bottom of said cylindrical shell.

6. The method which comprises preparing a wet, comminuted ore for electrostatic separation in two stages of drying by partially drying said wet, comminuted ore in a first stage to a moisture content of between about 0.5% and about 3% by weight by suspending and conveying said ore in a stream of combustion gases previously partially cooled in a second stage, separating the partially dried ore from the combustion gases, further drying said ore in the form of at least one slowly moving column of comminuted solids in a second stage to a moisture content of less than about 0.2% by weight by indirect heat exchange between said ore and combustion gases, whereby said gases are partially cooled for use in said first stage, and whereby the solids comprising said dried ore are maintained relatively free from surface contamination and withdrawing the dried ore from said second stage.

References Cited in the file of this patent

UNITED STATES PATENTS

| | | |
|---|---|---|
| 486,806 | Batcheller | Nov. 22, 1892 |
| 965,214 | Mullen | July 26, 1910 |
| 1,219,155 | Rigby | Mar. 13, 1917 |
| 1,913,470 | Andersen | June 13, 1933 |
| 2,754,965 | Lawver | July 17, 1956 |

FOREIGN PATENTS

| | | |
|---|---|---|
| 682,759 | Germany | Oct. 21, 1939 |
| 125,103 | Sweden | May 31, 1949 |